(12) United States Patent
Cui et al.

(10) Patent No.: US 11,606,684 B2
(45) Date of Patent: Mar. 14, 2023

(54) METHOD AND DEVICE FOR RESOLVING DUAL SUBSCRIBER IDENTITY MODULE PAGING CONFLICT

(71) Applicant: Beijing Xiaomi Mobile Software Co., Ltd., Beijing (CN)

(72) Inventors: Hengbin Cui, Beijing (CN); Jingjing Pu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/991,594

(22) Filed: Aug. 12, 2020

(65) Prior Publication Data

US 2021/0281999 A1    Sep. 9, 2021

(30) Foreign Application Priority Data

Mar. 9, 2020 (CN) .......................... 202010158295.0

(51) Int. Cl.
| | |
|---|---|
| *H04W 68/00* | (2009.01) |
| *H04W 8/18* | (2009.01) |
| *H04W 76/25* | (2018.01) |
| *H04W 76/28* | (2018.01) |
| *H04W 76/27* | (2018.01) |
| *H04W 88/06* | (2009.01) |

(52) U.S. Cl.
CPC ......... *H04W 8/183* (2013.01); *H04W 68/005* (2013.01); *H04W 76/25* (2018.02); *H04W 76/27* (2018.02); *H04W 76/28* (2018.02); *H04W 88/06* (2013.01)

(58) Field of Classification Search
None
See application file for complete search history.

(56) References Cited

U.S. PATENT DOCUMENTS

| | | | |
|---|---|---|---|
| 2014/0204817 A1* | 7/2014 | Ekici ................ | H04W 52/0216 370/311 |
| 2016/0234782 A1 | 8/2016 | Su et al. | |

(Continued)

FOREIGN PATENT DOCUMENTS

| | | |
|---|---|---|
| DE | 102015203167 A1 | 9/2015 |
| KR | 20170141095 A | 12/2017 |

(Continued)

OTHER PUBLICATIONS

European Search Report in European Application No. 20193256.3, dated Jan. 20, 2021.

(Continued)

*Primary Examiner* — Gary Lafontant
(74) *Attorney, Agent, or Firm* — Finnegan, Henderson, Farabow, Garrett & Dunner, L.L.P.

(57) ABSTRACT

A method for resolving a dual Subscriber Identity Module (DS) paging conflict, applied to user equipment (UE), includes: acquiring a Connected Discontinuous Reception (cDRX) long cycle for paging a data service Subscriber Identity Module (SIM) and a Discontinuous Reception (DRX) cycle for paging a call service SIM; in response to determining that the cDRX long cycle equals the DRX cycle, sending a DRX cycle changing request to a base station associated with the call service SIM; and resetting the DRX cycle based on a DRX cycle changing response sent by the base station.

8 Claims, 8 Drawing Sheets

(56) References Cited

U.S. PATENT DOCUMENTS

| | | | |
|---|---|---|---|
| 2017/0196042 A1 | 7/2017 | Shah et al. | |
| 2017/0280473 A1 | 9/2017 | Krishnamoorthy et al. | |
| 2018/0020464 A1 | 1/2018 | Liang et al. | |
| 2018/0220329 A1 | 8/2018 | Arumugam et al. | |
| 2018/0249349 A1 | 8/2018 | Hu et al. | |
| 2018/0368099 A1 | 12/2018 | Chen et al. | |
| 2020/0053830 A1* | 2/2020 | Venkataraman | H04W 68/02 |

FOREIGN PATENT DOCUMENTS

| | | | |
|---|---|---|---|
| WO | WO 2015/180059 A1 | 12/2015 | |
| WO | WO-2015180059 A1 * | 12/2015 | H04W 76/19 |

OTHER PUBLICATIONS

Intel, Sony, OPPO, InterDigital, "Solution for Paging Reception with PO collision avoidance", 3GPP TSG SA WG2 Meeting #S2-136AH, S2-2000164, Jan. 13-17, 2020, Incheon, KR, 4 pages.

Vivo, China Telecom, CAICT, Xiaomi, CMCC, Charter Communications, China Unicom, Samsung, "Considerations on multi-SIM study in RAN", 3GPP TSG RAN Meeting #84, RP-191304, Jun. 3-6, 2019, Newport Beach, USA, 7 pages.

Qualcomm Incorporated, apple, vivo, CATT, "Solution for paging collision avoidance", 3GPP TSG SA WG2 Meeting #136AH, S2-2000116, Jan. 13-17, 2020, Incheon, Korea, 6 pages.

Notice of Reasons for Refusal dated Sep. 16, 2021, from the Japanese Patent Office in counterpart Japanese Application No. 2020-128280.

Decision to Grant a Patent of Japanese Application No. 2020-128280, dated May 2, 2022.

First Office Action of Chinese Application No. 202010158295.0, dated Jun. 22, 2022.

\* cited by examiner

METHOD AND DEVICE FOR RESOLVING DUAL SUBSCRIBER IDENTITY MODULE PAGING CONFLICT

CROSS-REFERENCE TO RELATED APPLICATIONS

This application is based on and claims priority to Chinese Patent Application No. 202010158295.0 filed on Mar. 9, 2020, the content of which is hereby incorporated by reference in its entirety.

TECHNICAL FIELD

The present disclosure relates to the technical field of user terminals, and more particularly, to a method and device for resolving a dual Subscriber Identity Module (DS) paging conflict.

BACKGROUND

Nowadays, 4G networks have been widely used, and application of 5G networks is on its way. Under such circumstances, a number of users use Dual SIM (subscriber identity module) Dual Standby (DSDS) cell phones. However, most of these are DSDS Single Pass cell phones. That is, when a service is being provided using one SIM, also known as a SIM card, the other SIM has to be in an idle state.

In an existing 4G network, most cell phones may support Discontinuous Reception (DRX) in an idle mode. The network may configure a DRX cycle for paging an idle cell phone. The cell phone may monitor a paging message periodically according to the DRX paging cycle configured by the network. Furthermore, the cell phone may save power through Connected DRX (cDRX) paging in a Long Term Evolution (LTE) connected state.

Thus, a cDRX cycle may be identical to a DRX cycle. For example, a network may configure a cDRX cycle for a SIM of a data service to be 32 radio frames (rf32, namely 320 ms, spec 36331). The network may configure a DRX cycle for a second SIM of a call service to be rf32 (320 ms) as well. Then, there is a chance that a paging conflict may occur frequently. This is because, due to a property of DSDS hardware of a cell phone, the cell phone can generally monitor paging of only one SIM at a time. In this case, there will be abnormality such as frequent disconnection of the cell phone, a failure to open a data page, a game stuttering, a call service SIM missing a call, etc., leading to degraded user experience.

SUMMARY

According to a first aspect of embodiments of the disclosure, a method for resolving a dual Subscriber Identity Module (DS) paging conflict, applied to user equipment (UE), comprises: acquiring a Connected Discontinuous Reception (cDRX) long cycle for paging a data service Subscriber Identity Module (SIM) and a Discontinuous Reception (DRX) cycle for paging a call service SIM; in response to determining that the cDRX long cycle equals the DRX cycle, sending a DRX cycle changing request to a base station associated with the call service SIM; and resetting the DRX cycle based on a DRX cycle changing response sent by the base station.

According to a second aspect of embodiments of the disclosure, a method for resolving a dual Subscriber Identity Module (DS) paging conflict, applied to a base station, includes: receiving a Discontinuous Reception (DRX) cycle changing request sent by user equipment (UE); and generating a DRX cycle changing response based on the DRX cycle changing request, and sending the DRX cycle changing response to the UE.

According to a third aspect of embodiments of the disclosure, user equipment (UE) includes a processor; and a memory storing an instruction executable by the processor. The processor is configured to: acquire a Connected Discontinuous Reception (cDRX) long cycle for paging a data service SIM and a Discontinuous Reception (DRX) cycle for paging a call service SIM; in response to determining that the cDRX long cycle equals the DRX cycle, send a DRX cycle changing request to a base station associated with the call service SIM; and reset the DRX cycle based on a DRX cycle changing response sent by the base station.

The above general description and detailed description below are but exemplary and explanatory, and do not limit the subject disclosure.

BRIEF DESCRIPTION OF THE ACCOMPANYING DRAWINGS

The accompanying drawings, which are incorporated in and constitute a part of this specification, illustrate embodiments consistent with the disclosure and, together with the specification, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of apparatuses and methods consistent with aspects related to the disclosure as recited in detail in the appended claims.

Terms used in the present disclosure are merely for describing exemplary embodiments instead of limiting the disclosure. For example, the terms "first," "second," may be used to describe various kinds of information, such information should not be limited to such a term, which is merely for distinguishing information of the same type. For example, first information may also be referred to as second information, and similarly, second information may also be referred to as first information. Depending on the context, the term "if" may be interpreted as "when" or "while" or "in response to determining that."

A Dual SIM Dual Standby (DSDS) Single Pass cell phone may be equipped with two SIMs for network access. In general, one SIM may be adapted to a data service, e.g., data usage, etc. The other SIM may be adapted to a call service, e.g., receiving an incoming call, making an outgoing call, etc. The data service SIM may generally be referred to as a primary SIM. The call service SIM may generally be referred to as a secondary SIM. When a user is browsing a web page, playing a game, etc., the data service SIM may be in a service linked state. In this case, a network may configure a cDRX cycle. When a user is receiving a call, making a call, etc., the call service SIM may be in a service linked state. In this case, a network may configure a DRX cycle. Therefore, under normal circumstances, the primary SIM and the secondary SIM of the cell phone may be in a state corresponding to a combination of a cDRX and a DRX.

When the cDRX cycle of the primary SIM and the DRX cycle of the secondary SIM are equal, there may be constant Dual SIM (DS) paging conflicts between pagings of the two SIMs. In this case, there will be constant abnormalities in usage of the cell phone, such as a failure to open a data page, a game stuttering or being interrupted, a secondary SIM missing a call, etc. This is because, in event of a conflict, the cell phone may randomly select to receive paging of one SIM, discarding the paging message of the other SIM. If paging of the secondary SIM is discarded, the user may miss a call. If paging of the primary SIM is discarded, a radio link failure may occur to the primary SIM, triggering Radio Resource Control (RRC) link reestablishment, thereby leading to upper service data stuttering.

Embodiments of the present disclosure provide a method for resolving a DS paging conflict. With the method, when it is determined that a Connected Discontinuous Reception (cDRX) long cycle for paging a data service SIM equals a Discontinuous Reception (DRX) cycle for paging a call service SIM, a DRX cycle changing request is sent to a base station associated with the call service SIM. The DRX cycle is reset based on a DRX cycle changing response sent by the base station. In this mode, frequent conflict in paging DS of a cell phone, which is due to the cDRX long cycle of the data service SIM being equal to the DRX cycle of the call service SIM, may be solved, improving user experience. The method may be applied to user equipment (UE) equipped with DS, such as a cell phone equipped with DS, so as to solve paging conflicts between two SIMs.

Figure 1:
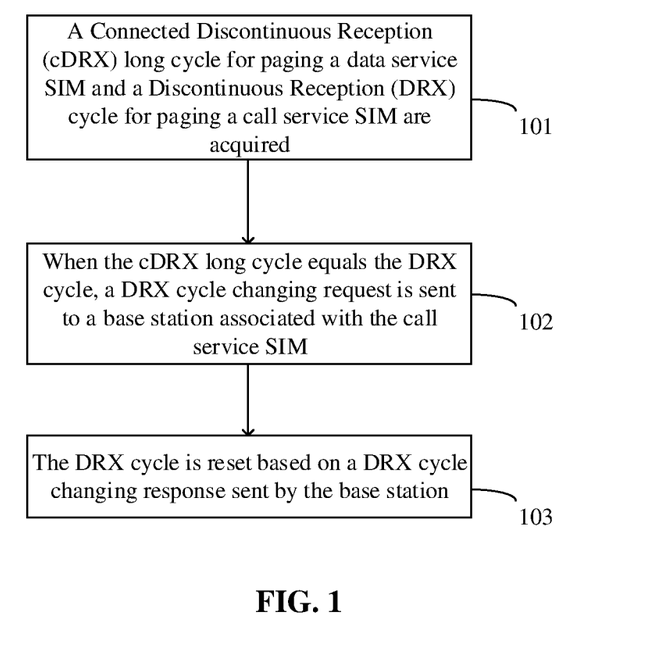
FIG. 1 is a flowchart of a method for resolving a DS paging conflict according to an exemplary embodiment.

FIG. 1 is a flowchart of a method for resolving a DS paging conflict according to an exemplary embodiment. As shown in FIG. 1, the method may include the following steps.

In step 101, a Connected Discontinuous Reception (cDRX) long cycle for paging a data service SIM and a Discontinuous Reception (DRX) cycle for paging a call service SIM are acquired.

In an embodiment, the data service SIM and the call service SIM may be registered successfully. The data service SIM or the call service SIM may enter a connected state. Then, the cDRX long cycle for paging the data service SIM and the DRX cycle for paging the call service SIM may be acquired and compared.

In step 102, when the cDRX long cycle equals the DRX cycle, a DRX cycle changing request is sent to a base station associated with the call service SIM.

In an embodiment, it may be determined whether the cDRX long cycle equals the DRX cycle by determining whether a parameter longDRX of cDRX of the data service SIM and a parameter defaultPagingcycle of DRX of the call service SIM are configured to be equal.

For example, the parameter longDRX may be configured to be longDRX-CycleStartOffset sf320:8//320 ms. The parameter defaultPagingcycle may be configured to be defaultPagingCycle rf32,//320 ms. This means that both the cDRX long cycle for paging the data service SIM and the DRX cycle for paging the call service SIM are 320 ms. In this case, the DRX cycle changing request may be sent to the base station associated with the call service SIM to solve the paging conflict.

In step 103, the DRX cycle is reset based on a DRX cycle changing response sent by the base station.

In an embodiment, the DRX cycle may be reset based on the DRX cycle changing response sent by the base station according to an agreed flow. The new DRX cycle may differ from the cDRX long cycle.

With the method, the DRX cycle for paging the call service SIM may be changed such that the new DRX cycle no longer equals the cDRX long cycle. Accordingly, frequent conflict in paging DS of the cell phone, due to the cDRX long cycle of the data service SIM being equal to the DRX cycle of the call service SIM, may be solved, improving user experience.

In an embodiment, the DRX cycle changing request may be sent to the base station associated with the call service SIM as follows.

A message may be sent to a Network Access Service (NAS) module, instructing the NAS module to send the DRX cycle changing request to the base station.

Having received the message, the NAS module may send the DRX cycle changing request to the base station. The request may be a tracking area update request, an attach request, etc. Accordingly, the DRX cycle may be changed by implementing a re-registration flow.

In an embodiment, the DRX cycle changing request may be sent to the base station associated with the call service SIM as follows.

A target DRX cycle may be determined. The target DRX cycle may be included in the DRX cycle changing request. Then, the DRX cycle changing request may be sent to the base station.

Alternatively, request information may be included in the DRX cycle changing request. The request information may be configured to request the base station to assign a new DRX cycle.

As described above, to change the DRX cycle, the target DRX cycle may be determined by the cell phone and sent to the base station. Alternatively, the new DRX cycle may be determined by the base station.

The cDRX long cycle may equal the DRX cycle. Then, the DRX cycle may need to be changed. The target DRX cycle may be determined by the cell phone, included in the DRX cycle changing request, and sent to the base station. Alternatively, no target DRX cycle is included in the DRX cycle changing request sent by the cell phone. Instead, request information configured to request the base station to assign a new DRX cycle may be included in the DRX cycle changing request. Having received the request, the base station may determine a new DRX cycle.

In the first case, when a tracking area update request or an attach request is sent to the base station, a parameter cycle_len_coeff in a parameter drx_params_incl may be set as a target parameter of the cell phone, such as to be rf64:640 ms. The target parameter may have to differ from the cDRX cycle for paging the data service SIM. A relevant parameter may be set as follows.

drx_params_incl=1 (0x1)
drx_params
split_pg_cycle_code=10 (0xa)
cycle_len_coeff=0 (0x0)//rf64/rf32/rf128 . . .
split_on_ccch=0 (0x0)
non_drx_timer=0 (0x0)

The target DRX cycle may be set through a parameter cycle_len_coeff.

In the second case, a parameter bit, such as cycle_change_req, may be set in the DRX cycle changing request to be sent to the base station, indicating a change request by the cell phone. In this mode, instead of specifying the target DRX cycle, the cell phone may set a parameter cycle_change_req in the DRX cycle changing request.

In an embodiment, before the DRX cycle is reset based on the DRX cycle changing response sent by the base station, the method may include the following steps.

The DRX cycle changing response sent by the base station may be received. The DRX cycle changing response may include the new DRX cycle. The new DRX cycle may equal the target DRX cycle. Alternatively, the new DRX cycle may differ from the target DRX cycle.

When the cell phone sends the target DRX cycle to the base station, the base station may have two reactions. Having received a tracking area update request or an attach request sent by the cell phone including the target DRX cycle, in response to the DRX cycle changing request by the cell phone, the base station may determine whether the target DRX cycle is compatible to the base station. If the target DRX cycle is compatible, the base station may configure a DRX parameter corresponding to the request sent by the cell phone. Otherwise if the target DRX cycle is incompatible, the base station may configure, according to a network environment configuration, a different new DRX cycle for the cell phone, and send the new DRX cycle to the cell phone.

The cell phone may send no target DRX cycle. A target DRX cycle may be determined by the base station. Having received a DRX cycle changing request sent by the cell phone, the base station may configure, according to a network environment configuration, a different new DRX cycle for the cell phone, and send the new DRX cycle to the cell phone.

Accordingly, in some cases, the target DRX cycle is configured by the base station and sent to the cell phone. Thus, the target DRX cycle may be configured by the cell phone or the base station.

In an embodiment, the DRX cycle changing request may be included in a tracking area update request or an attach request. After the cell phone has sent the tracking area update request or the attach request, the new DRX cycle may be configured by implementing a re-registration flow.

In an embodiment, the DRX cycle changing request may be sent to the base station associated with the call service SIM as follows: a Network Access Service (NAS) module may be instructed to send the DRX cycle changing request, and the DRX cycle changing request may be sent to the base station using the NAS module. For example, the NAS module may be instructed by an RRC module to send the DRX cycle changing request.

In an embodiment, the DRX cycle may be reset based on the DRX cycle changing response sent by the base station as follows: the DRX cycle may be increased based on the DRX cycle changing response sent by the base station. Thus, the DRX cycle may be replaced by a greater DRX cycle.

Figure 2:
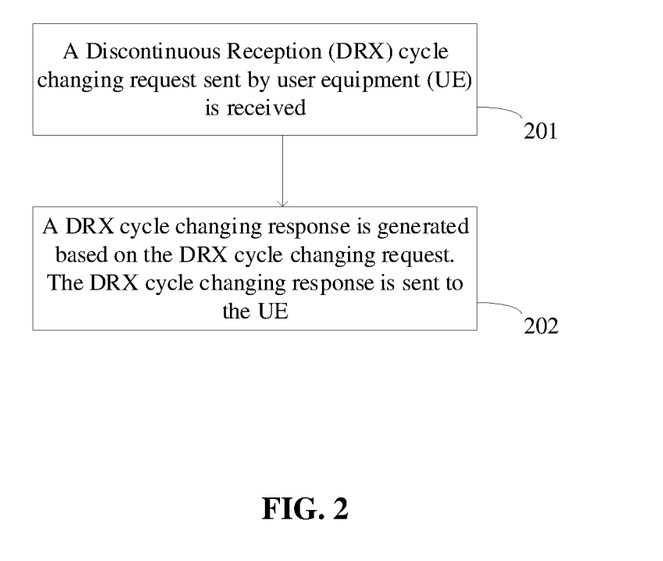
FIG. 2 is a flowchart of a method for resolving a DS paging conflict according to an exemplary embodiment.

FIG. 2 is a flowchart of a method for resolving a DS paging conflict according to an exemplary embodiment. The method may be used in a base station. As shown in FIG. 2, the method includes the following steps.

In step 201, a Discontinuous Reception (DRX) cycle changing request sent by user equipment (UE) is received.

In step 202, a DRX cycle changing response is generated based on the DRX cycle changing request. The DRX cycle changing response is sent to the UE.

Having received the DRX cycle changing request, the base station may respond based on different cases as follows.

In an embodiment, the DRX cycle changing response may be generated based on the DRX cycle changing request, and sent to the UE as follows.

When the DRX cycle changing request includes a target DRX cycle, and the target DRX cycle is not supported, a new DRX cycle may be configured. The new DRX cycle may be included in the DRX cycle changing response. The DRX cycle changing response may be sent to the UE.

When the DRX cycle changing request includes no target DRX cycle, a new DRX cycle may be configured. The new DRX cycle may be included in the DRX cycle changing response. The DRX cycle changing response may be sent to the UE.

When the DRX cycle changing request includes a target DRX cycle, and the target DRX cycle is supported, the base station may configure a parameter based on the target DRX cycle, and send a response message to the UE.

Figure 3:
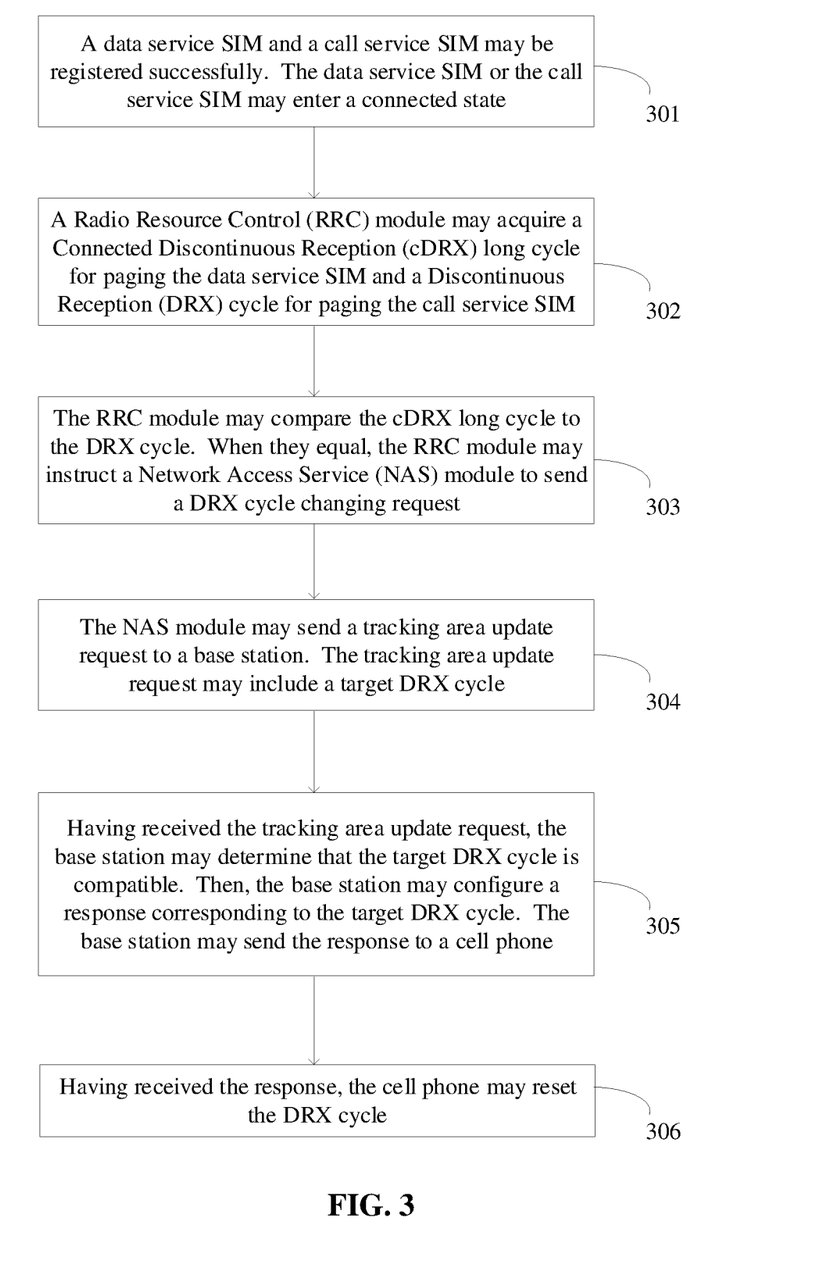
FIG. 3 is a flowchart of a method for resolving a DS paging conflict according to an exemplary embodiment.

FIG. 3 is a flowchart of a method for resolving a DS paging conflict according to an exemplary embodiment.

In step 301, a data service SIM and a call service SIM may be registered successfully. The data service SIM or the call service SIM may enter a connected state.

In step 302, a Radio Resource Control (RRC) module may acquire a Connected Discontinuous Reception (cDRX) long cycle for paging the data service SIM and a Discontinuous Reception (DRX) cycle for paging the call service SIM.

In step 303, the RRC module may compare the cDRX long cycle to the DRX cycle. When they equal, the RRC module may instruct a Network Access Service (NAS) module to send a DRX cycle changing request.

In step 304, the NAS module may send a tracking area update request to a base station. The tracking area update request may include a target DRX cycle.

In step 305, having received the tracking area update request, the base station may determine that the target DRX cycle is compatible. Then, the base station may configure a response corresponding to the target DRX cycle. The base station may send the response to a cell phone.

In step 306, having received the response, the cell phone may reset the DRX cycle.

Figure 4:
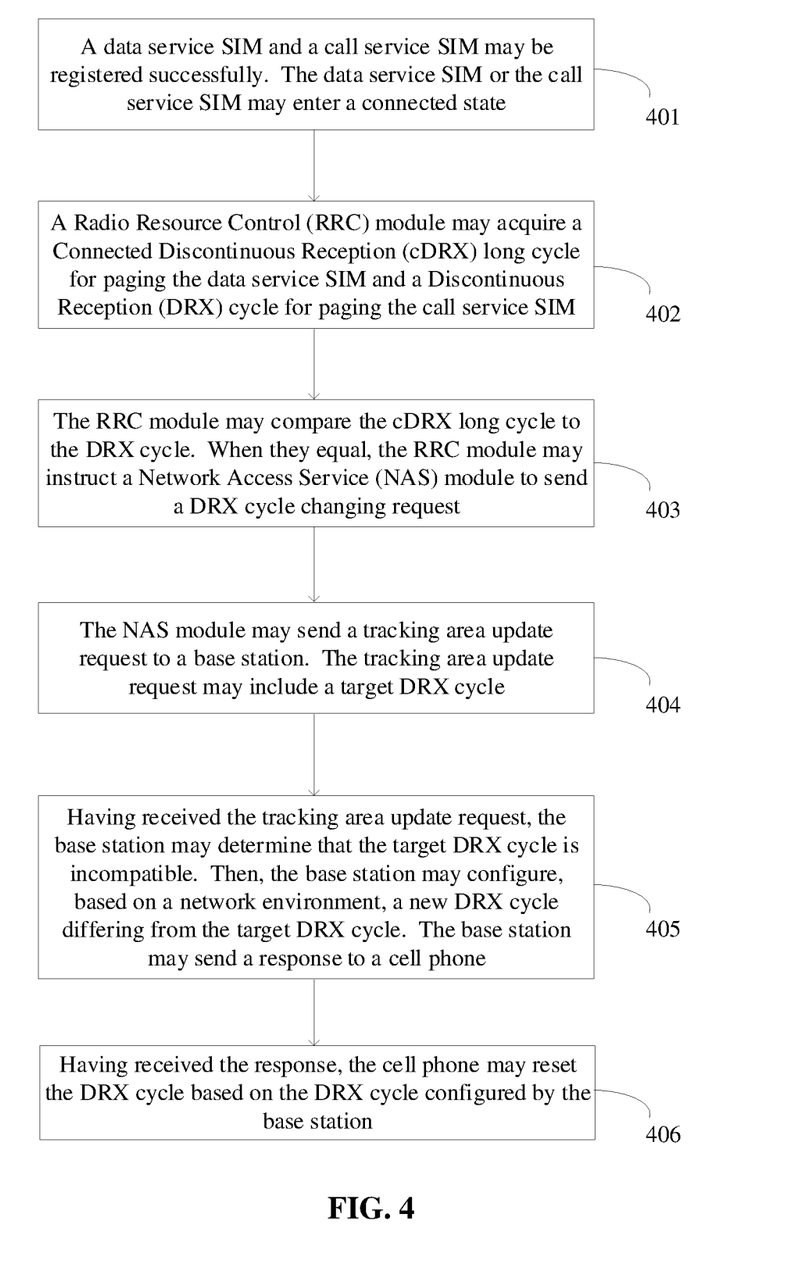
FIG. 4 is a flowchart of a method for resolving a DS paging conflict according to an exemplary embodiment.

FIG. 4 is a flowchart of a method for resolving a DS paging conflict according to an exemplary embodiment.

In step 401, a data service SIM and a call service SIM may be registered successfully. The data service SIM or the call service SIM may enter a connected state.

In step 402, a Radio Resource Control (RRC) module may acquire a Connected Discontinuous Reception (cDRX) long cycle for paging the data service SIM and a Discontinuous Reception (DRX) cycle for paging the call service SIM.

In step 403, the RRC module may compare the cDRX long cycle to the DRX cycle. When they equal, the RRC module may instruct a Network Access Service (NAS) module to send a DRX cycle changing request.

In step 404, the NAS module may send a tracking area update request to abase station. The tracking area update request may include a target DRX cycle.

In step 405, having received the tracking area update request, the base station may determine that the target DRX cycle is incompatible. Then, the base station may configure, based on a network environment, a new DRX cycle differing from the target DRX cycle. The base station may send a response to a cell phone.

In step 406, having received the response, the cell phone may reset the DRX cycle based on the DRX cycle configured by the base station.

Figure 5:
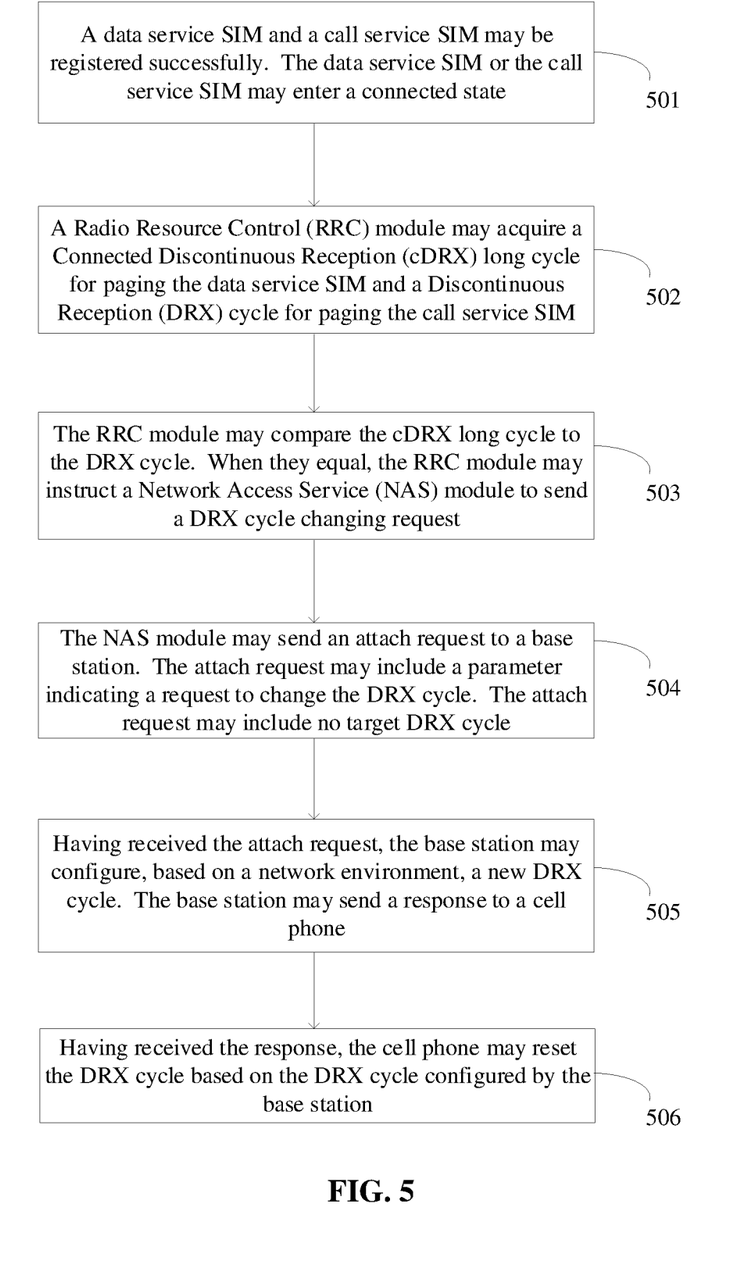
FIG. 5 is a flowchart of a method for resolving a DS paging conflict according to an exemplary embodiment.

FIG. 5 is a flowchart of a method for resolving a DS paging conflict according to an exemplary embodiment.

In step 501, a data service SIM and a call service SIM may be registered successfully. The data service SIM or the call service SIM may enter a connected state.

In step 502, a Radio Resource Control (RRC) module may acquire a Connected Discontinuous Reception (cDRX) long cycle for paging the data service SIM and a Discontinuous Reception (DRX) cycle for paging the call service SIM.

In step 503, the RRC module may compare the cDRX long cycle to the DRX cycle. When they equal, the RRC module may instruct a Network Access Service (NAS) module to send a DRX cycle changing request.

In step 504, the NAS module may send an attach request to a base station. The attach request may include a parameter indicating a request to change the DRX cycle. The attach request may include no target DRX cycle.

In step 505, having received the attach request, the base station may configure a new DRX cycle based on a network environment. The base station may send a response to a cell phone.

In step 506, having received the response, the cell phone may reset the DRX cycle based on the DRX cycle configured by the base station.

Figure 6:
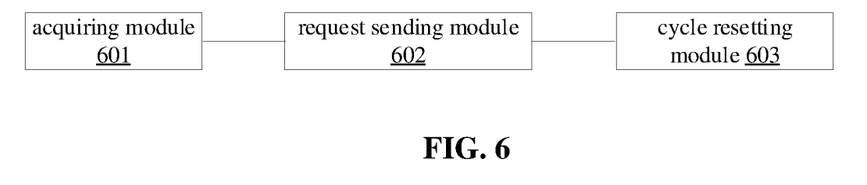
FIG. 6 is a block diagram of a device for resolving a DS paging conflict according to an exemplary embodiment.

FIG. 6 is a block diagram of a device for resolving a DS paging conflict according to an exemplary embodiment. For example, the device may be UE. As shown in FIG. 6, the device may include an acquiring module 601, a request sending module 602, and a cycle resetting module 603.

The acquiring module 601 is configured to acquire a Connected Discontinuous Reception (cDRX) long cycle for paging a data service SIM and a Discontinuous Reception (DRX) cycle for paging a call service SIM.

The request sending module 602 is configured to, in response to determining that the cDRX long cycle equals the DRX cycle, send a DRX cycle changing request to a base station associated with the call service SIM.

The cycle resetting module 603 is configured to reset the DRX cycle based on a DRX cycle changing response sent by the base station.

The request sending module 602 may be further configured to determine a target DRX cycle, include the target DRX cycle in the DRX cycle changing request, and send the DRX cycle changing request to the base station.

Alternatively, the request sending module 602 may be further configured to include request information in the DRX cycle changing request. The request information may be configured to request the base station to assign a new DRX cycle.

In an embodiment, the device may further include a receiving module configured to receive the DRX cycle changing response sent by the base station. The DRX cycle changing response may include the new DRX cycle. The new DRX cycle may equal the target DRX cycle. The new DRX cycle may differ from the target DRX cycle.

In an embodiment, the DRX cycle changing request may be included in a tracking area update request or an attach request.

In an embodiment, the request sending module 602 may include an instructing module and a Network Access Service (NAS) module.

The instructing module may be configured to instruct the NAS module to send the DRX cycle changing request.

The NAS module may be configured to send the DRX cycle changing request to the base station.

In an embodiment, the cycle resetting module 603 may be further configured to increase the DRX cycle based on the DRX cycle changing response sent by the base station.

Figure 7:
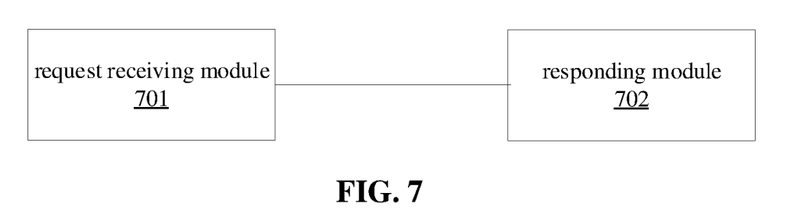
FIG. 7 is a block diagram of a device for resolving a DS paging conflict according to an exemplary embodiment.

FIG. 7 is a block diagram of a device for resolving a DS paging conflict according to an exemplary embodiment. For example, the device may be a base station. As shown in FIG. 7, the device may include a request receiving module 701 and a responding module 702.

The request receiving module 701 is configured to receive a Discontinuous Reception (DRX) cycle changing request sent by user equipment (UE).

The responding module 702 is configured to generate a DRX cycle changing response based on the DRX cycle changing request; and send the DRX cycle changing response to the UE.

The responding module 702 may be further configured to, in response to determining that the DRX cycle changing request includes a target DRX cycle, and that the target DRX cycle is not supported, configure a new DRX cycle, include the new DRX cycle in the DRX cycle changing response, and send the DRX cycle changing response to the UE.

Alternatively, the responding module 702 may be further configured to, in response to determining that the DRX cycle changing request includes no target DRX cycle, configure a new DRX cycle, include the new DRX cycle in the DRX cycle changing response, and send the DRX cycle changing response to the UE.

Specific operations performed by the various modules have been described above in the method embodiments, which will not be repeated here.

With the method, when it is determined that a Connected Discontinuous Reception (cDRX) long cycle for paging a data service SIM equals a Discontinuous Reception (DRX) cycle for paging a call service SIM, a DRX cycle changing request is sent to a base station associated with the call service SIM. The DRX cycle is reset based on a DRX cycle changing response sent by the base station. In this mode, frequent conflict in paging DS of a cell phone, due to the cDRX long cycle of the data service SIM being equal to the DRX cycle of the call service SIM, may be solved, improving user experience.

Figure 8:
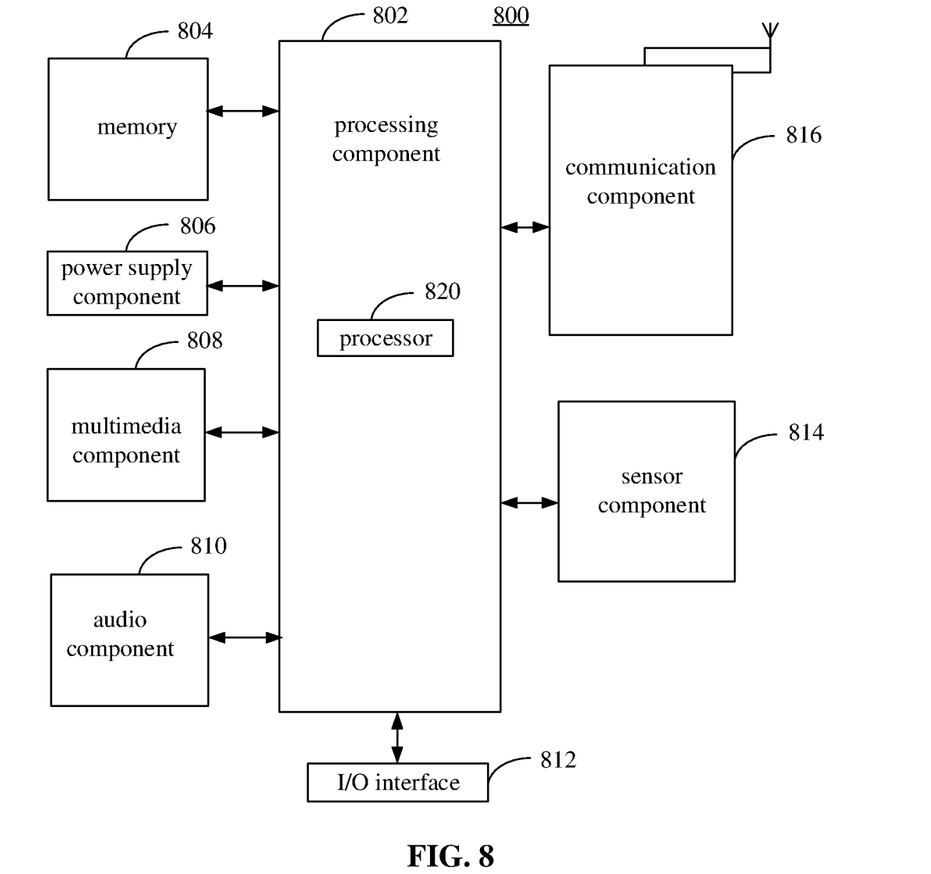
FIG. 8 is a block diagram of a device according to an exemplary embodiment.

FIG. 8 is a block diagram of a device 800 for resolving a DS paging conflict according to an exemplary embodiment. For example, the device 800 may be user equipment (UE) or a base station.

Referring to FIG. 8, the device 800 may include at least one of a processing component 802, memory 804, a power supply component 806, a multimedia component 808, an audio component 810, an Input/Output (I/O) interface 812, a sensor component 814, a communication component 816, etc.

The processing component 802 may generally control an overall operation of the device 800, such as operations associated with display, a telephone call, data communication, a camera operation, a recording operation, etc. The processing component 802 may include one or more processors 820 to execute instructions so as to complete all or a part of the above described methods. In addition, the processing component 802 may include one or more modules to facilitate interaction between the processing component 802 and other components. For example, the processing component 802 may include a multimedia portion to facilitate interaction between the multimedia component 808 and the processing component 802.

The memory 804 may be configured to store various types of data to support the operation at the device 800. Examples of such data may include instructions of any application or method configured to operate on the device 800, contact data, phonebook data, messages, pictures, videos, etc. The memory 804 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 806 may supply electric power to various components of the device 800. The power supply component 806 may include a power management system, one or more power sources, and other components related to generating, managing, and distributing electricity for the device 800.

The multimedia component 808 may include a screen that provides an output interface between the device 800 and a user. The screen may include a Liquid Crystal Display (LCD), a Touch Panel (TP), etc. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 808 may include at least one of a front camera or a rear camera. When the device 800 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 810 may be configured to output and/or input an audio signal. For example, the audio component 810 may include a microphone (MIC). When the device 800 is in an operation mode such as a call mode, a recording mode, a voice recognition mode, etc., the MIC may be configured to receive an external audio signal. The received audio signal may be further stored in the memory 804 or may be sent via the communication component 816. The audio component 810 may further include a loudspeaker configured to output the audio signal.

The I/O interface 812 may provide an interface between the processing component 802 and a peripheral interface portion. Such a peripheral interface portion may be a keypad, a click wheel, a button, etc. Such a button may include but is not limited to at least one of a homepage button, a volume button, a start button, or a lock button.

The sensor component 814 may include one or more sensors for assessing various states of the device 800. For example, the sensor component 814 may detect an on/off state of the device 800 and relative positioning of components such as the display and the keypad of the device 800. The sensor component 814 may further detect a change in the position of the device 800 or of a component of the device 800, whether there is contact between the device 800 and a user, the orientation or acceleration/deceleration of the device 800, a change in the temperature of the device 800, etc. The sensor component 814 may include a proximity sensor configured to detect existence of a nearby object without physical contact. The sensor component 814 may further include an optical sensor such as a Complementary Metal-Oxide-Semiconductor (CMOS) or a Charge-Coupled-Device (CCD) image sensor used in an imaging application. The sensor component 814 may further include an acceleration sensor, a gyroscope sensor, a magnetic sensor, a pressure sensor, a temperature sensor, etc.

The communication component 816 may be configured to facilitate wired or wireless communication between the device 800 and other equipment. The device 800 may access a wireless network based on a communication standard such as Wi-Fi, 4G, 5G . . . , or a combination thereof. The communication component 816 may broadcast related information or receive a broadcast signal from an external broadcast management system via a broadcast channel. The communication component 816 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

In an exemplary embodiment, the device 800 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

In an exemplary embodiment, a non-transitory computer-readable storage medium including instructions, such as the memory 804 including instructions, may be provided. The instructions may be executed by the processor 820 of the device 800 to perform the above described methods. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

In an exemplary embodiment, a non-transitory computer-readable storage medium has stored therein instructions which, when executed by a processor of a device, cause the device to perform a method for resolving a DS paging conflict. The method includes: acquiring a Connected Discontinuous Reception (cDRX) long cycle for paging a data service SIM and a Discontinuous Reception (DRX) cycle for paging a call service SIM; in response to determining that the cDRX long cycle equals the DRX cycle, sending a DRX cycle changing request to a base station associated with the call service SIM; and resetting the DRX cycle based on a DRX cycle changing response sent by the base station.

Other implementations of the present disclosure will be apparent to a person having ordinary skill in the art after considering the specification and practicing the disclosure. The disclosure is intended to cover any variation, use, or adaptation of the disclosure following the general principles of the disclosure and including such departures from the disclosure as come within common knowledge or customary practice in the art. The specification and the embodiments are intended to be exemplary only, with a true scope and spirit of the subject disclosure being indicated by the appended claims.

The disclosure is not limited to the exact construction that has been described above and illustrated in the accompanying drawings, and that various modifications and changes can be made to the disclosure without departing from the scope of the disclosure. It is intended that the scope of the disclosure is limited only by the appended claims.

What is claimed is:

1. A method for resolving a dual Subscriber Identity Module (DS) paging conflict, applied to user equipment (UE), the method comprising:
acquiring a Connected Discontinuous Reception (cDRX) long cycle for paging a data service Subscriber Identity Module (SIM) in a Long Term Evolution (LTE) connected state and a Discontinuous Reception (DRX) cycle for paging a call service SIM in an idle state;
determining that the cDRX long cycle equals the DRX cycle by determining that a parameter longDRX of cDRX of the data service SIM and a parameter defaultPagingcycle of DRX of the call service SIM are configured to be equal;
in response to determining that the cDRX long cycle equals the DRX cycle, sending a DRX cycle changing request to a base station associated with the call service SIM; and
increasing the DRX cycle based on a DRX cycle changing response sent by the base station, wherein a new DRX cycle after the increasing is greater than the cDRX long cycle,
wherein sending the DRX cycle changing request to the base station associated with the call service SIM comprises:
sending a message to a Network Access Service (NAS) module, to instruct the NAS module to send the DRX cycle changing request to the base station; and
sending, using the NAS module, the DRX cycle changing request to the base station, wherein the DRX cycle changing request is included in one of a tracking area update request or an attach request, wherein the DRX cycle is changed by implementing a re-registration flow.

2. The method of claim 1, wherein sending the DRX cycle changing request to the base station associated with the call service SIM comprises one of:
determining a target DRX cycle, including the target DRX cycle in the DRX cycle changing request, and sending the DRX cycle changing request to the base station; or
including request information in the DRX cycle changing request, the request information being configured to request the base station to assign the new DRX cycle.

3. The method of claim 2, before increasing the DRX cycle based on the DRX cycle changing response sent by the base station, further comprising:
receiving the DRX cycle changing response sent by the base station, the DRX cycle changing response comprising the new DRX cycle, the new DRX cycle equaling the target DRX cycle or differing from the target DRX cycle.

4. A method for resolving a dual Subscriber Identity Module (DS) paging conflict, applied to a base station, the method comprising:
receiving a Discontinuous Reception (DRX) cycle changing request sent by user equipment (UE) for changing a DRX cycle for paging a call service Subscriber Identity Module (SIM) in an idle state and associated with the base station; and
generating a DRX cycle changing response based on the DRX cycle changing request, and sending the DRX cycle changing response to the UE, the DRX cycle changing response comprising a new DRX cycle greater than a Connected Discontinuous Reception (cDRX) long cycle for paging a data service SIM in a Long Term Evolution (LTE) connected state,
wherein receiving the DRX cycle changing request sent by the UE for changing the DRX cycle comprises:
receiving the DRX cycle changing request sent by a Network Access Service (NAS) module, wherein the DRX cycle changing request is included in one of a tracking area update request or an attach request, wherein the DRX cycle is changed by implementing a re-registration flow.

5. The method of claim 4, wherein generating the DRX cycle changing response based on the DRX cycle changing request, and sending the DRX cycle changing response to the UE comprises one of:
in response to determining that the DRX cycle changing request includes a target DRX cycle, and that the target DRX cycle is not supported, configuring the new DRX cycle, including the new DRX cycle in the DRX cycle changing response, and sending the DRX cycle changing response to the UE; or
in response to determining that the DRX cycle changing request includes no target DRX cycle, configuring the new DRX cycle, including the new DRX cycle in the DRX cycle changing response, and sending the DRX cycle changing response to the UE.

6. User equipment (UE), comprising:
a processor; and
a memory storing an instruction executable by the processor,
wherein the processor is configured to:
acquire a Connected Discontinuous Reception (cDRX) long cycle for paging a data service Subscriber Identity Module (SIM) in a Long Term Evolution (LTE) connected state and a Discontinuous Reception (DRX) cycle for paging a call service SIM in an idle state;
determine that the cDRX long cycle equals the DRX cycle by determining that a parameter longDRX of cDRX of the data service SIM and a parameter defaultPagingcycle of DRX of the call service SIM are configured to be equal;
in response to determining that the cDRX long cycle equals the DRX cycle, send a DRX cycle changing request to a base station associated with the call service SIM; and
increase the DRX cycle based on a DRX cycle changing response sent by the base station, wherein a new DRX cycle after the increasing is greater than the cDRX long cycle,
wherein in sending the DRX cycle changing request to the base station associated with the call service SIM, the processor is further configured to:
send a message to a Network Access Service (NAS) module, to instruct the NAS module to send the DRX cycle changing request to the base station; and
send, using the NAS module, the DRX cycle changing request to the base station, wherein the DRX cycle changing request is included in one of a tracking area update request or an attach request, wherein the DRX cycle is changed by implementing a re-registration flow.

7. The UE of claim 6, wherein in sending the DRX cycle changing request to the base station associated with the call service SIM, the processor is further configured to perform one of:
determining a target DRX cycle, including the target DRX cycle in the DRX cycle changing request, and sending the DRX cycle changing request to the base station; or including request information in the DRX cycle changing request, the request information being configured to request the base station to assign the new DRX cycle.

8. The UE of claim 7, wherein before increasing the DRX cycle based on the DRX cycle changing response sent by the base station, the processor is further configured to:

receive the DRX cycle changing response sent by the base station, the DRX cycle changing response comprising the new DRX cycle, the new DRX cycle equaling the target DRX cycle or differing from the target DRX cycle.

* * * * *